US011271877B2

(12) United States Patent
Goyal et al.

(10) Patent No.: US 11,271,877 B2
(45) Date of Patent: Mar. 8, 2022

(54) PRIMARY CHAT BOT SERVICE AND SECONDARY CHAT BOT SERVICE INTEGRATION

(71) Applicant: ServiceNow, Inc., Santa Clara, CA (US)

(72) Inventors: Gaurav Goyal, San Jose, CA (US); Yong Liang, Santa Clara, CA (US); Vivien Wai Mun Leong, San Mateo, CA (US); Shipra Gupta, Sunnyvale, CA (US); Kakarla V V D L Narayana, Hyderabad (IN)

(73) Assignee: ServiceNow, Inc., Santa Clara, CA (US)

(*) Notice: Subject to any disclaimer, the term of this patent is extended or adjusted under 35 U.S.C. 154(b) by 4 days.

(21) Appl. No.: 16/931,174

(22) Filed: Jul. 16, 2020

(65) Prior Publication Data

US 2022/0021630 A1    Jan. 20, 2022

(51) Int. Cl.
| | |
|---|---|
| *G06F 40/30* | (2020.01) |
| *G06Q 10/10* | (2012.01) |
| *G06F 40/35* | (2020.01) |
| *G06Q 50/00* | (2012.01) |
| *H04L 51/02* | (2022.01) |
| *G06N 20/00* | (2019.01) |
| *G06F 40/20* | (2020.01) |
| *H04L 51/046* | (2022.01) |

(52) U.S. Cl.
CPC .............. *H04L 51/02* (2013.01); *G06F 40/20* (2020.01); *G06N 20/00* (2019.01); *H04L 51/046* (2013.01)

(58) Field of Classification Search
CPC ....... H04L 51/02; H04L 51/046; G06F 40/20; G06N 20/00
See application file for complete search history.

(56) References Cited

U.S. PATENT DOCUMENTS

| | | | |
|---|---|---|---|
| 2006/0041660 A1* | 2/2006 | Bishop | H04L 41/069 |
| | | | 709/224 |
| 2019/0166071 A1* | 5/2019 | Lim | H04L 51/02 |
| 2019/0199658 A1* | 6/2019 | Kim | H04L 51/14 |
| 2020/0028803 A1* | 1/2020 | Helmy | G06N 5/041 |
| 2020/0342850 A1* | 10/2020 | Vishnoi | H04L 51/02 |
| 2021/0044547 A1* | 2/2021 | Bradley | H04L 51/02 |

* cited by examiner

*Primary Examiner* — Soe Hlaing
(74) *Attorney, Agent, or Firm* — Van Pelt, Yi & James LLP (57) ABSTRACT

A chat message from a user to a primary chat bot service is received. A secondary chat bot service is automatically evaluated and selected to handle the chat message, wherein the secondary chat bot service is selected from a plurality of candidate secondary chat bot services that includes at least one chat bot service provided by a third-party entity external to an entity providing the primary chat bot service. The chat message is forwarded to the selected secondary chat bot service.

20 Claims, 6 Drawing Sheets

PRIMARY CHAT BOT SERVICE AND SECONDARY CHAT BOT SERVICE INTEGRATION

BACKGROUND OF THE INVENTION

A chat bot (also referred to herein as a chat bot service, a bot, etc.) is a software application that is able to conduct a conversation, typically via text, with a human user. Chat bots are designed to simulate the manner in which a human would behave as a conversation partner, thus serving as a replacement for human conversation agents. Chat bots are typically used in dialog systems for a variety of purposes, including customer service, technical assistance, and information gathering. In many scenarios, multiple chat bots exist within a single user environment and serve different purposes. Chat bot ecosystems such as these can cause confusion for users (e.g., confusion as to which chat bots to ask which questions). Thus, it would be beneficial to develop techniques directed toward improving chat bot integration to allow for improved user experiences.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A chat message from a user to a primary chat bot service is received. A secondary chat bot service is automatically evaluated and selected to handle the chat message, wherein the secondary chat bot service is selected from a plurality of candidate secondary chat bot services that includes at least one chat bot service provided by a third-party entity external to an entity providing the primary chat bot service. The chat message is forwarded to the selected secondary chat bot service. A practical and technological benefit of the techniques disclosed herein is a more efficient and streamlined computer-to-user interface. Users (e.g., of a platform as a service (PAAS)) oftentimes have multiple chat bots with which to communicate. Prior approaches involving separate communication with the multiple chat bots are inefficient due to users needing to manually select from among the different chat bots, which wastes time for the users and can lead to confusion. With the improved computer-to-user interface, users do not need to manually select from among the different chat bots. By having a primary chat bot that becomes a main interface, users are able to ask questions within the knowledge domains of secondary chat bots simply by communicating with the primary chat bot.

Figure 1:
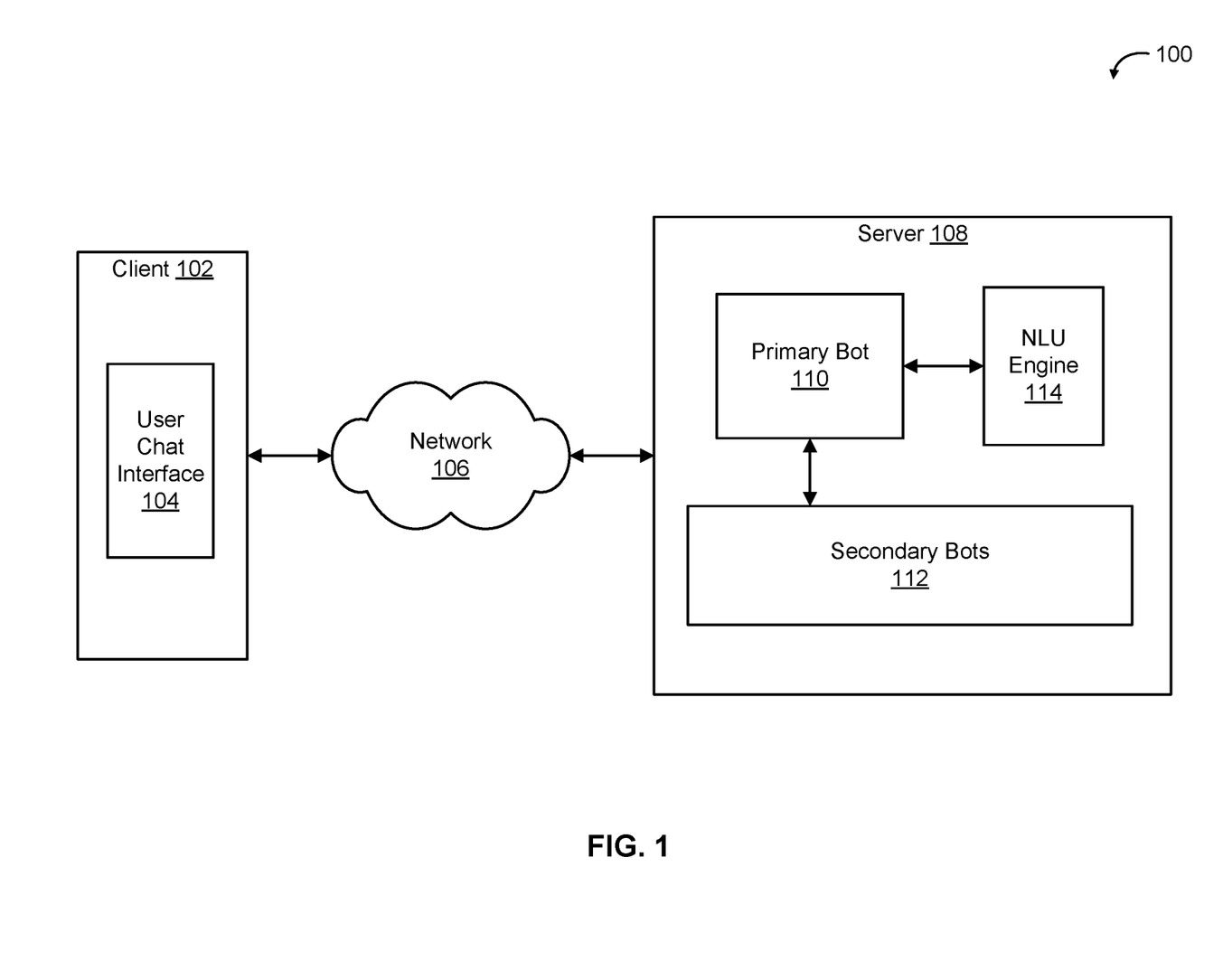
FIG. 1 is a block diagram illustrating an embodiment of system for messaging with chat bot services.

FIG. 1 is a block diagram illustrating an embodiment of system for messaging with chat bot services. In the example shown, system 100 includes client 102, network 106, and server 108. In various embodiments, client 102 is a computer or other hardware device that a user utilizes to send messages to and receive messages from one or more chat bot services. Examples of client hardware devices include desktop computers, laptop computers, tablets, smartphones, and other devices. In the example illustrated, client 102 includes user chat interface 104. In various embodiments, user chat interface 104 is a software user interface through which the user communicates with chat bot services. For example, the software user interface may be a web portal, internal network portal, or other portal that allows users to submit and receive messaging content. Other examples of software for chat messaging include browsers, mobile apps, etc.

In the example illustrated, client 102 is communicatively connected to network 106. Chat messages may be transmitted to and responses received from server 108 using network 106. Examples of network 106 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, server 108 is a computer or other hardware component that provides chat bot service functionality. In various embodiments, server 108 includes a plurality of chat bot services.

In the example illustrated, primary bot 110, secondary bots 112, and NLU engine 114 reside on server 108. In various embodiments, primary bot 110 and secondary bots 112 are computer software that are configured to conduct conversations (e.g., via text) with human users. These conversations are typically for the purpose of assisting the human users. Examples of purposes served by the chat bot services of server 108 include booking a reservation, resolving an information technology issue, responding to a finance query, providing weather information, providing other information in response to a query, and other purposes. In various embodiments, primary bot 110 is responsible for managing chat messages and distributing chat messages to secondary bots 112. Stated alternatively, in various embodiments, primary bot 110 is an orchestrator that coordinates with secondary bots 112.

A benefit of having a primary bot that coordinates with other bots is a better chat messaging experience for the user. In many scenarios, a chat bot ecosystem includes a variety of different chat bots, each with a specialized function. For example, secondary bots 112 may include an information technology chat bot (to help with information technology issues), a finance chat bot (to help with finance questions), a reservation chat bot (e.g., to book restaurant reservations), a weather chat bot (to answer questions about the weather), etc. Having conversations with different chat bot services to fulfill different purposes can cause confusion for the user. Thus, routing all queries through a primary bot that manages the various conversations can improve the user's experience. In various embodiments, primary bot 110 receives all user chat messages (regardless of type) and serves as a channel between the user and specialized secondary bots. This provides a seamless user experience in which the user does not need to individually manage conversations with the specialized bots nor be aware that he or she is having conversations with different specialized chat bots for different topics of inquiry.

In many scenarios, the various specialized chat bots are created by various parties and integrated into a PAAS. In various embodiments, primary bot 110 is provided by a party/entity that is external to one or more parties/entities providing secondary bots 112. In various embodiments, an administrator of server 108 (e.g., a user running an instance of a PAAS) implements communication logic in primary bot 110 to communicate with and pass control to various secondary bots. Communication between a primary bot and secondary bots is described in further detail herein. In the example shown, primary bot 110 and secondary bots 112 are located on the same server. It is also possible for some of the bots in the bot ecosystem to be located on a server separate from but communicatively connected to server 108.

In the example illustrated, NLU engine 114 is communicatively connected to primary bot 110. NLU (natural language understanding) may be utilized by primary bot 110 to determine intents from utterances (in chat messages) provided by a user of client 102. The determined intents can be utilized to select appropriate secondary bots suited to the determined intents. For example, if the determined intent is to book a restaurant reservation, a restaurant booking bot could be selected. In various embodiments, NLU engine 114 utilizes a machine learning model to determine what a chat message means. Stated alternatively, in various embodiments, a machine learning model is utilized to map utterances to intent. As used herein, an utterance refers to a natural language example of a user intent, e.g., a text string from a chat message entered by the user and an intent refers to something that the user wants to happen or that a system should do. It is also possible to determine an entity associated with the intent, which refers to an object of, or context for, an action, e.g., a laptop, a user role, a priority level, or an instance.

For example, the machine learning model may determine that the utterance "I'm really hungry and could go for some pizza" maps to an intent to order food, which can cause primary bot 110 to open a communication channel between the user and a secondary bot that specializes in ordering food for delivery or pickup. Examples of machine learning models that can be utilized to perform NLU tasks include word vector representations, window-based neural networks, recurrent neural networks, long-short-term-memory models, recursive neural networks, and convolutional neural networks. Prior to utilizing the machine learning model, the machine learning model is trained on a collection of utterance examples and their associated intents. This training occurs before a new utterance (each new chat message) is processed using the machine learning model in inference mode.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, additional clients may exist. The number of components and the connections shown in FIG. 1 are merely illustrative. Components not shown in FIG. 1 may also exist.

Figure 2:
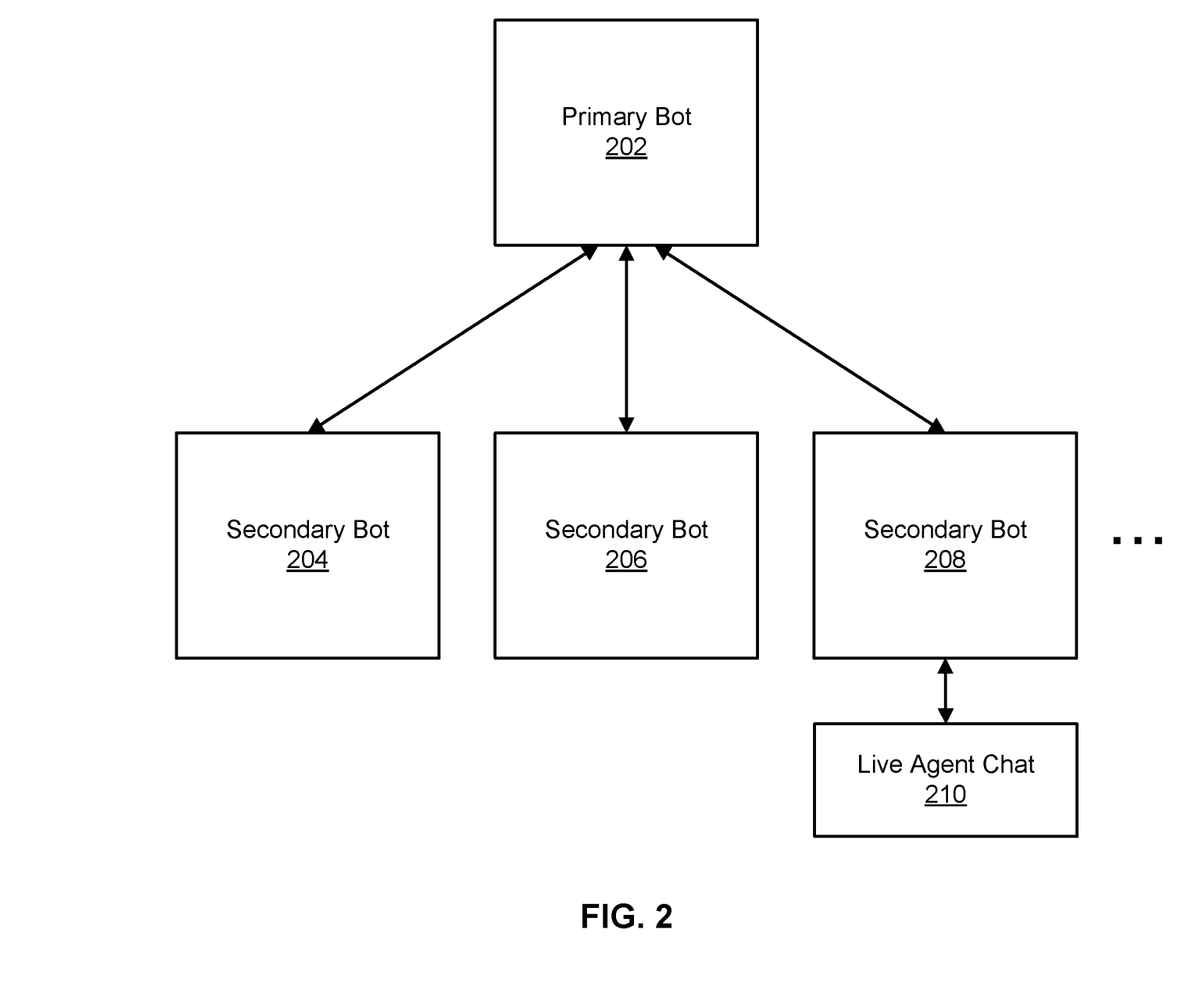
FIG. 2 is a diagrammatic representation of an example communications structure among chat bot services.

FIG. 2 is a diagrammatic representation of an example communications structure among chat bot services. In the example illustrated, primary bot 202 is communicatively connected to secondary bot 204, secondary bot 206, and secondary bot 208. In some embodiments, primary bot 202 is primary bot 110 of FIG. 1. In some embodiments, secondary bots 204, 206, and 208 are bots from among secondary bots 112 of FIG. 1. In various embodiments, at least one of the secondary bots is provided by a third-party entity external to an entity providing primary bot 202. Primary bot 202 may be provided by a third-party entity external to an entity providing a PAAS hosting primary bot 202 and secondary bots 204, 206, and 208. One of the secondary bots may be provided by the entity providing the PAAS. It is also possible for primary bot 202 to be provided by the entity providing the PAAS.

In some embodiments, a secondary bot facilitates a conversation between a user and a live agent. In the example illustrated, secondary bot 208 is communicatively connected to live agent chat 210. If secondary bot 208 determines that a live (human) agent is required to assist the user (or if the user requests a human agent), then a communication channel may be established through secondary bot 208 and primary bot 202 between the user and the live agent. Stated alternatively, secondary bot 208 and primary bot 202 may perform behind the scenes routing of message traffic between the user and the live agent. In some embodiments, primary bot 202 hands off the user (and the chat messaging conversation) to secondary bot 208. An advantage of doing so is that primary bot 202 can devote computational resources to other tasks and/or users while waiting for the live agent to asynchronously respond, which can be relatively long compared with chat bot response times. In some embodiments, each live agent response is posted to a specified portion of primary bot 202 to indicate to primary bot 202 that it needs to pick up a chat messaging conversation that was handed off. An advantage of the above approach is a seamless interface for the user when switching from conversing with a chat bot to a live agent, which reduces user confusion and improves user experience.

Figure 3:
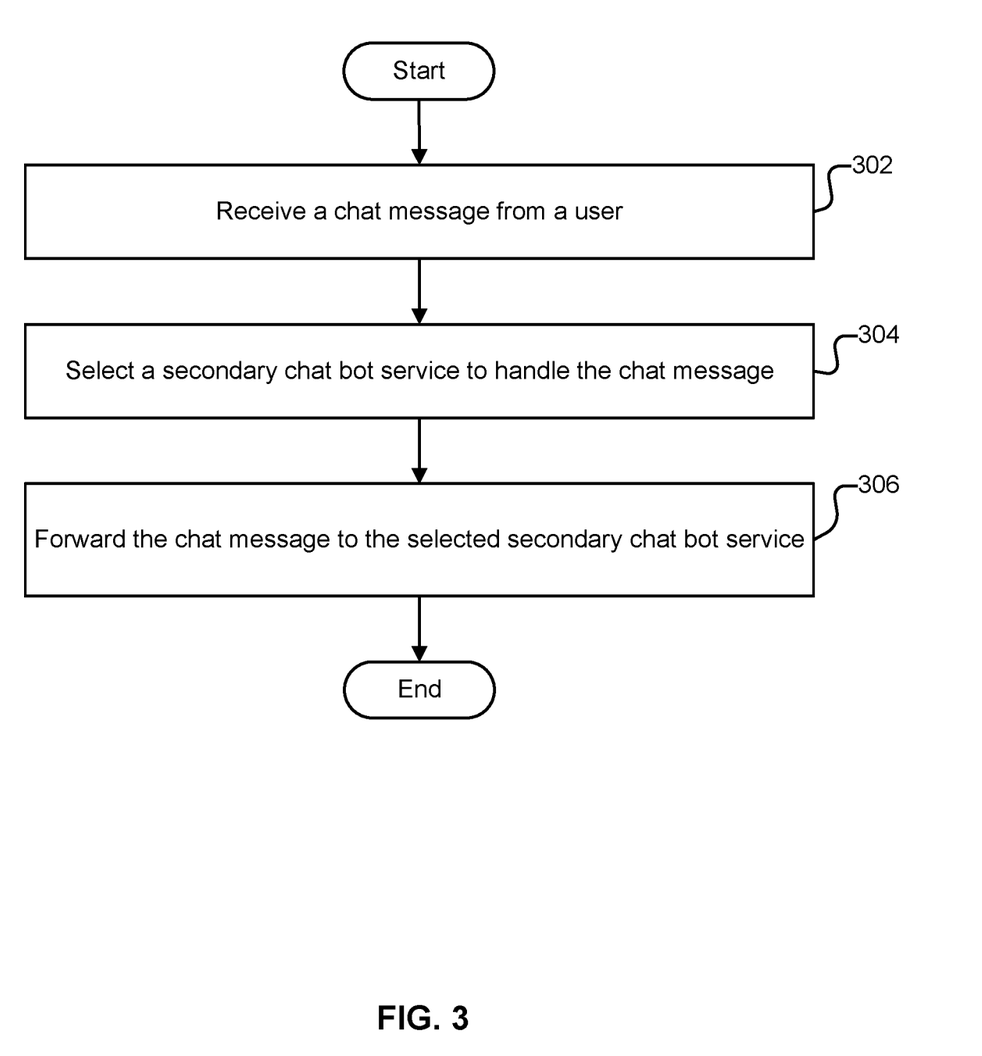
FIG. 3 is a flow chart illustrating an embodiment of a process for routing a chat message from a user.

FIG. 3 is a flow chart illustrating an embodiment of a process for routing a chat message from a user. In some embodiments, the process of FIG. 3 is performed by primary bot 110 of FIG. 1.

At 302, a chat message is received from a user. In various embodiments, the chat message is sent by a human user via a user chat interface (e.g., user chat interface 104 of FIG. 1). In some embodiments, the chat message is received by primary bot 110 of FIG. 1. In various embodiments, the chat message is not constrained or filtered before being received. Stated alternatively, any type of chat message may be received. For example, the chat message may be an information technology request (e.g., a request to fix a laptop, unlock a user account, reboot a computer system, etc.), a financial records lookup request, a request to book a restaurant reservation, or any other type of request that can be handled by a chat bot service.

At 304, a secondary chat bot service is selected to handle the chat message. In various embodiments, the secondary chat bot is selected based on the message content of the chat message. In various embodiments, each of a plurality of secondary chat bot services are automatically evaluated by a primary chat bot service to select the secondary chat bot service to handle the chat message. In various embodiments, at least one chat bot service of the plurality of secondary chat bot services is provided by a third-party entity external to an entity providing the primary chat bot service. Various approaches for selecting the secondary chat bot service may be employed. In some embodiments, the primary chat bot service broadcasts the chat message to all secondary chat bot services, waits for the secondary chat bot services to each provide a score associated with how applicable/relevant the chat message is to that secondary chat bot service, and selects the secondary chat bot service returning the highest score. Determining scores may be based at least in part on matching keywords in the chat message to specified keywords associated with the secondary chat bot services. Alternatively, in some embodiments, the primary chat bot service selects a secondary chat bot service to handle the chat message based on the chat message and without broadcasting the chat message to all the secondary chat bot services. For example, the primary chat bot service may utilize an NLU engine to determine an intent of the chat message to match against functionality information associated with the secondary chat bot services, wherein the functionality information is readily accessible by the primary chat bot service (e.g., via a mapping table).

At 306, the chat message is forwarded to the selected secondary chat bot service. In various embodiments, all follow-up traffic is then routed to the selected secondary chat bot service until a specified condition to switch to a different secondary chat bot service is met. The primary chat bot service may pass a control flag to the selected secondary chat bot service to designate the selected secondary chat bot service as being in control of the conversation with the user.

Figure 4:
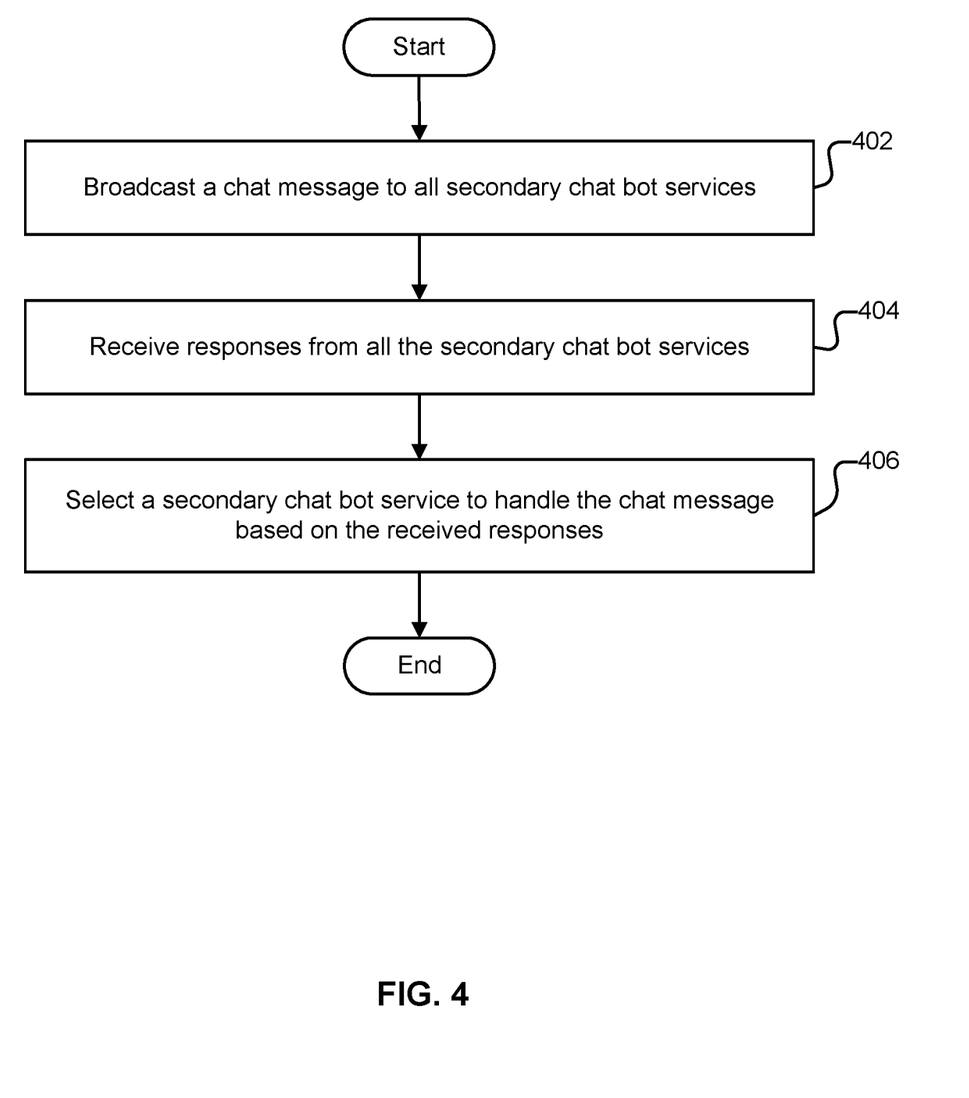
FIG. 4 is a flow chart illustrating an embodiment of a process for selecting a secondary chat bot service by broadcasting a chat message.

FIG. 4 is a flow chart illustrating an embodiment of a process for selecting a secondary chat bot service by broadcasting a chat message. In some embodiments, the process of FIG. 4 is performed by primary bot 110 of FIG. 1. In some embodiments, at least a portion of the process of FIG. 4 is performed in 304 of FIG. 3.

At 402, a chat message is broadcasted to all secondary chat bot services. For example, as illustrated in FIG. 2, the chat message would be sent from primary bot 202 to all the secondary bots, including secondary bot 204, secondary bot 206, and secondary bot 208. In various embodiments, the chat message (from a human user) is broadcasted by a primary chat bot service (e.g., primary bot 202 in FIG. 2). The primary chat bot service acts as a coordinator to determine which secondary chat bot service is the most appropriate chat bot service to respond to the chat message. In this scenario, the primary chat bot service broadcasts the chat message to all secondary chat bot services because the primary chat bot service does not have enough information as to which secondary chat bot service is most appropriate without querying the secondary chat bot services. In various embodiments, the primary chat bot service expects and waits for each secondary chat bot service to return a score indicating how applicable/relevant the chat message is for that secondary chat bot service.

At 404, responses are received from all the secondary chat bot services. In various embodiments, the responses include a score (e.g., a relevance score) associated with the chat message from each of the secondary chat bot services. In some embodiments, scores that are returned are based at least in part on keyword matching. For example, a secondary chat bot service specializing in restaurant reservations may search for "restaurant", "reservation", "book a time", "lunch", "dinner", and other specified keywords in the chat message. The score may depend on the number of keywords matched (e.g., more keywords matched could correspond to a higher score). As another example, a secondary chat bot service specializing in information technology troubleshooting may search for "fix", "broken", "computer", "problem", "technical assistance", "repair", and other specified keywords in the chat message. In some embodiments, a score is reduced if the secondary chat bot service detects specified keywords that are out of the scope of what the secondary chat bot service is configured to handle. In some embodiments, secondary chat bot services utilize NLU engines (e.g., an NLU engine similar to NLU engine 114 of FIG. 1) to generate scores corresponding to how well the intent of the chat message maps to functionality of the secondary chat bot services.

In some embodiments, one or more secondary chat bot services are communicatively connected to their own NLU engines (analogous to how the primary chat bot service can be communicatively connected to an NLU engine). In this manner, secondary chat bot services can utilize their NLU engines to detect intents based on utterances (within the chat message) to generate scores associated with how relevant the chat message is to each secondary chat bot service instead of (or in addition to) relying on word matching logic. Each NLU engine is able to extract meaning (an intent) from the chat message. Each NLU engine may be a machine learning model trained to output intents based on utterance inputs (e.g., the machine learning model is trained on a collection of utterance examples and their associated intents before the machine learning model is utilized in inference mode for new utterances). Examples of machine learning models that can be utilized to perform NLU tasks include word vector representations, window-based neural networks, recurrent neural networks, long-short-term-memory models, recursive neural networks, and convolutional neural networks.

Each secondary chat bot service may be associated with its own NLU engine that is also specifically trained to output a score associated with chat message relevance to that secondary chat bot service. For example, a secondary chat bot service specializing in restaurant reservations could be trained on a collection of utterance examples and associated relevance scores with respect to restaurant reservations (e.g., utterance examples such as "I want to make a dinner reservation" are associated with high relevance scores and utterance examples such as "I want my computer fixed" are associated with low relevance scores). Relevance scores may also be determined based on mapping detected intent and secondary chat bot functionality (e.g., via a mapping table). For example, a detected intent associated with making a restaurant reservation would strongly map to the functionality of a restaurant reservation secondary chat bot service, resulting in a high relevance score returned for the restaurant reservation secondary chat bot service (but not for other secondary chat bot services).

At 406, a secondary chat bot service is selected to handle the chat message based on the received responses. In various embodiments, the selection is based on relevance scores received from the secondary chat bot services. The secondary chat bot service associated with the highest score may be selected to handle the chat message. In some embodiments, the raw scores received are further processed prior to selecting a secondary chat bot service. For example, the raw scores may be normalized (e.g., to a scale from zero to one). In some embodiments, past performance of specific secondary chat bot services influences their returned scores (e.g., boosting scores of secondary chat bot services that have handled many requests successfully, lowering scores of secondary chat bot services that frequently return artificially high scores, etc.). In some embodiments, the performance of the selected secondary chat bot service is utilized to refine future scores associated with that secondary chat bot service (e.g., according to specified rules mapping conversation outcome to score, using a machine learning model to train score adjustment, etc.).

In some embodiments, if none of the scores that are received reach a specified threshold, the primary chat bot service prompts the user to provide clarification as to the user's request (e.g., asks the user additional questions to obtain additional chat messages to send to the secondary chat bot services from which to derive scores). In various embodiments, after processing raw scores, a highest score is identified and a corresponding secondary chat bot service is selected to handle follow-up chat messages with the user. The primary chat bot service keeps a channel between the user and the selected secondary chat bot service open until a condition to end the chat session is met (e.g., when the user indicates the conversation has been completed, when the secondary chat bot service cannot handle the subject matter provided by the user because the user has switched to a different conversation topic, etc.).

Figure 5:
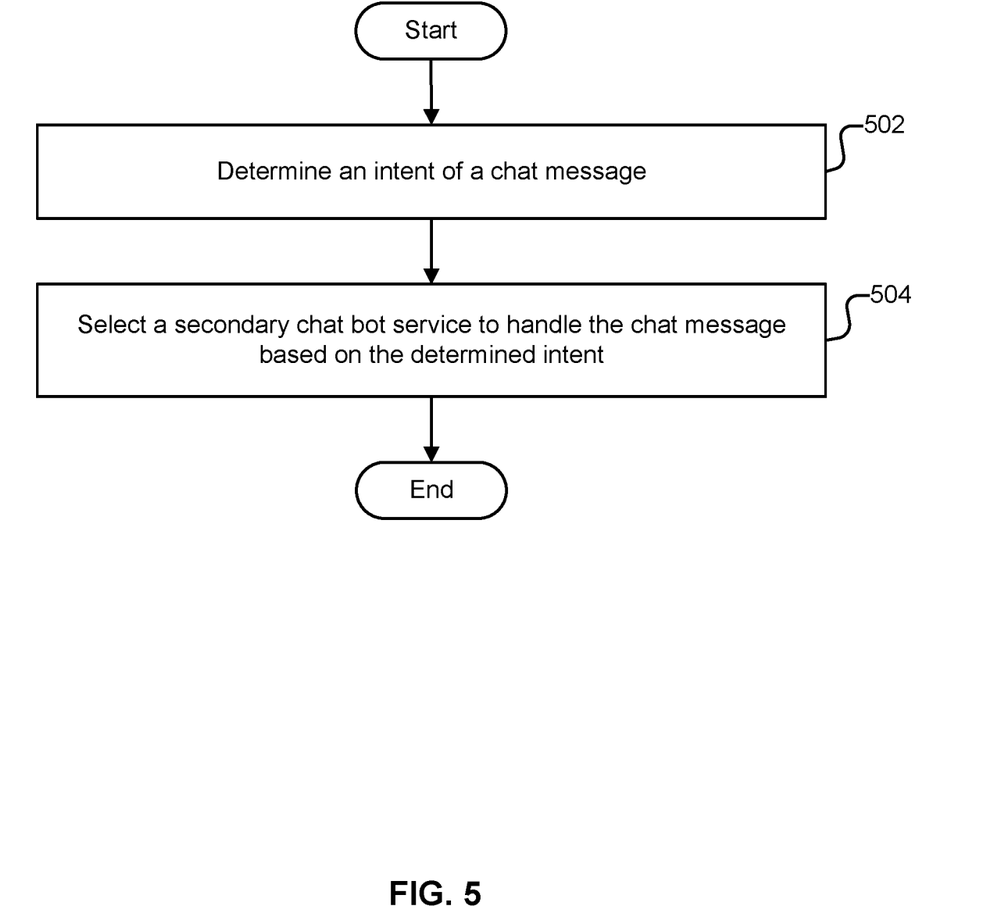
FIG. 5 is a flow chart illustrating an embodiment of a process for selecting a secondary chat bot service without broadcasting a chat message.

FIG. 5 is a flow chart illustrating an embodiment of a process for selecting a secondary chat bot service without broadcasting a chat message. In some embodiments, the process of FIG. 5 is performed by primary bot 110 of FIG. 1. In some embodiments, at least a portion of the process of FIG. 5 is performed in 304 of FIG. 3.

At 502, an intent of a chat message is determined. In some embodiments, the intent of the chat message is determined by NLU engine 114 of FIG. 1. In various embodiments, a primary chat bot service (e.g., primary bot 110 of FIG. 1) is communicatively connected to an NLU engine (e.g., NLU engine 114 of FIG. 1) that is able to extract meaning from the chat message. Furthermore, in various embodiments, the primary chat bot service has access to high-level information regarding secondary chat bot services that are eligible to be selected to handle the chat message. In some embodiments, the primary chat bot service accesses a mapping table that maps intents to functionality of secondary chat bot services. In various embodiments, the mappings in the mapping table are a priori populated by the secondary chat bot services.

At 504, a secondary chat bot service is selected to handle the chat message based on the determined intent. For example, in various embodiments, a secondary chat bot service whose functionality most closely maps to the determined intent (e.g., according to a mapping table) is selected. In this scenario, the primary chat bot service is intelligent in the sense that it is aware of (has access to) the capabilities of the various secondary chat bot services. Thus, the primary chat bot service can select a secondary chat bot service to handle the chat message without broadcasting the chat message to all the secondary chat bot services.

Figure 6:
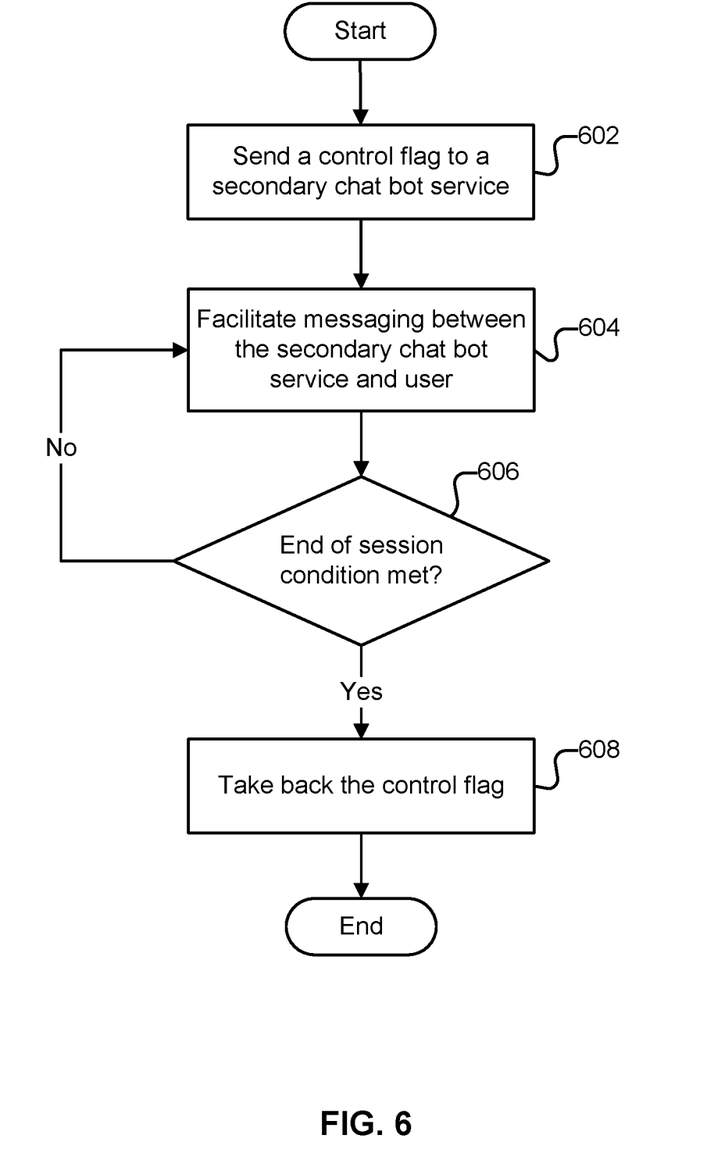
FIG. 6 is a flow chart illustrating an embodiment of a process for ending a secondary chat bot service session.

FIG. 6 is a flow chart illustrating an embodiment of a process for ending a secondary chat bot service session. In some embodiments, the process of FIG. 6 is performed by primary bot 110 of FIG. 1. In some embodiments, the process of FIG. 6 is performed after 306 of FIG. 3.

At 602, a control flag is sent to a secondary chat bot service. In various embodiments, the secondary chat bot service has been selected by a primary chat bot service to handle an automated conversation with a (human) user regarding a topic within the secondary chat bot service's area of expertise/specialization. The control flag indicates that no other secondary chat bot services are allowed to converse with the user (to avoid confusion) unless authorized by the primary chat bot service. The control flag mechanism allows for the opening of a communication channel between the user and the selected secondary chat bot service while also freeing up the primary chat bot service to perform other tasks. The example of a control flag mechanism is illustrative and not restrictive. Other mechanisms to establish a communication channel between the user and the secondary chat bot service are also possible.

At 604, messaging between the secondary chat bot service and the user is facilitated. In various embodiments, the primary chat bot service maintains a communication channel for a current chat session between the user and the selected secondary chat bot service. All messaging traffic is routed through this communication channel for the user until a specified condition to create a new communication channel is met.

At 606, it is determined whether a condition to end the chat session has been met. Examples of conditions that would end the chat session include: the user has sent a chat message indicating the conversation should end (e.g., if the user's request has been handled satisfactorily), the user has switched to a different topic that the secondary chat bot service is not configured to handle, the secondary chat bot service has failed to advance the conversation (respond relevantly) a threshold number of times (e.g., due to the secondary chat bot service being unable to understand the user), the secondary chat bot service has not been responsive for a threshold amount of time according to a timer (e.g., due to a technical failure of hardware or software associated with the secondary chat bot service), etc. If the secondary chat bot service has failed a specified number of times consecutively (e.g., two times) to respond to user chat messages (e.g., failed to answer a user question), the primary chat bot service may attempt to respond to the user or attempt to obtain clarification from the user (e.g., ask the user to rephrase a question, provide more information, etc.).

If at 606 it is determined that no condition to end the chat session has been met, at 604, the chat session continues. If at 606 it is determined that a condition to end the chat session has been met, at 608, the control flag is taken back (by the primary chat bot service). After the control flag is taken back, a different secondary chat bot service to assist the user may be selected. For example, if the user has switched from asking about a restaurant reservation to asking about an information technology problem, a chat session with a restaurant reservation bot would end and a chat session with an information technology bot could begin (due to the restaurant reservation bot not being capable of handling information technology requests). In some embodiments, the primary chat service bot selects a different secondary chat service bot in a chat bot ecosystem (e.g., as shown in FIGS. 1 and 2) by performing the process of FIG. 3. Stated alternatively, in some embodiments, the process for selecting an appropriate secondary chat bot service is repeated when the user switches conversation topics.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving a chat message from a user to a primary chat bot service;
    automatically evaluating and selecting a secondary chat bot service to handle the chat message, wherein the secondary chat bot service is selected from a plurality of candidate secondary chat bot services that includes at least one chat bot service provided by a third-party entity external to an entity providing the primary chat bot service;
    forwarding the chat message to the selected secondary chat bot service;
    commencing a first chat session between the user and the selected secondary chat bot service;
    determining that during the first chat session the selected secondary chat bot service has responded with non-relevant content to the user a multiple number of times;
    terminating the first chat session between the user and the selected secondary chat bot service; and
    automatically evaluating and selecting a different secondary chat bot service from the plurality of candidate secondary chat bot services to continue a conversation with the user in a second chat session immediately following the termination of the first chat session.

2. The method of claim 1, wherein the chat message is associated with one of the following: a request to provide information, a request to resolve a technology issue, or a request to perform a service task.

3. The method of claim 1, wherein the chat message is received via a network.

4. The method of claim 1, wherein automatically evaluating and selecting the secondary chat bot service includes transmitting the chat message to the plurality of candidate secondary chat bot services.

5. The method of claim 4, further comprising waiting for and receiving responses from the plurality of candidate secondary chat bot services, wherein a received response is associated with an applicability of a corresponding candidate secondary chat bot service to the chat message.

6. The method of claim 5, wherein the received responses are numerical scores.

7. The method of claim 5, wherein the applicability is based at least in part on matching specified words associated with a function of the corresponding candidate secondary chat bot service to words in the chat message.

8. The method of claim 1, wherein automatically evaluating and selecting the secondary chat bot service includes comparing a plurality of scores corresponding to the plurality of candidate secondary chat bot services.

9. The method of claim 1, wherein automatically evaluating and selecting the secondary chat bot service includes determining an intent associated with the chat message.

10. The method of claim 9, wherein determining the intent associated with the chat message includes utilizing a natural language understanding machine learning model.

11. The method of claim 1, wherein automatically evaluating and selecting the secondary chat bot service includes mapping an intent associated with the chat message to functionalities of the plurality of candidate secondary chat bot services.

12. The method of claim 1, wherein at least one chat bot service among the plurality of candidate secondary chat bot services is configured to route the chat message to a live agent that is able to respond to the chat message by transmitting a response via a same communications channel utilized to transmit the chat message from the user to the live agent.

13. The method of claim 1, further comprising transferring a status indicator of the primary chat bot service to the selected secondary chat bot service, wherein the status indicator identifies which chat bot service is currently handling chat messages from the user.

14. The method of claim 1, further comprising determining whether the user has indicated that the user desires to discontinue chat messaging with the selected secondary chat bot service.

15. The method of claim 1, further comprising determining whether the selected secondary chat bot service has been communicatively unavailable for a threshold amount of time.

16. The method of claim 1, further comprising determining whether the selected secondary chat bot service is capable of handling a subsequent chat message from the user.

17. A system, comprising:
    one or more processors configured to:
        receive a chat message from a user to a primary chat bot service;
        automatically evaluate and select a secondary chat bot service to handle the chat message, wherein the secondary chat bot service is selected from a plurality of candidate secondary chat bot services that includes at least one chat bot service provided by a third-party entity external to an entity providing the primary chat bot service;
        forward the chat message to the selected secondary chat bot service;
        commence a first chat session between the user and the selected secondary chat bot service;
        determine that during the first chat session the selected secondary chat bot service has responded with non-relevant content to the user a multiple number of times;
        terminate the first chat session between the user and the selected secondary chat bot service; and
        automatically evaluate and select a different secondary chat bot service from the plurality of candidate secondary chat bot services to continue a conversation with the user in a second chat session immediately following the termination of the first chat session; and
    a memory coupled to at least one of the one or more processors and configured to provide the one or more processors with instructions.

18. A method, comprising:

receiving at a selected secondary chat bot service from a primary chat bot service, a forwarded chat message provided by a user, wherein the primary chat bot service has automatically evaluated and selected the selected secondary chat bot service to handle the chat message, wherein the secondary chat bot service was selected from a plurality of candidate secondary chat bot services that includes at least one chat bot service provided by a third-party entity external to an entity providing the primary chat bot service;

providing to the primary chat bot service for the user, a response message responsive to the forwarded chat message;

commencing a first chat session between the user and the selected secondary chat bot service;

determining that during the first chat session the selected secondary chat bot service has responded with non-relevant content to the user a multiple number of times;

terminating the first chat session between the user and the selected secondary chat bot service; and automatically evaluating and selecting a different secondary chat bot service from the plurality of candidate secondary chat bot services to continue a conversation with the user in a second chat session immediately following the termination of the first chat session.

19. The method of claim 18, wherein the chat message is associated with one of the following: a request to provide information, a request to resolve a technology issue, or a request to perform a service task.

20. The method of claim 18, wherein the chat message is received via a network.

* * * * *